United States Patent [19]

Baughman et al.

[11] 4,274,844
[45] Jun. 23, 1981

[54] EVAPORATOR

[75] Inventors: Richard C. Baughman, Geneseo; Michael A. Giometti, Rochester, both of N.Y.

[73] Assignee: Eastman Kodak Company, Rochester, N.Y.

[21] Appl. No.: 77,874

[22] Filed: Sep. 21, 1979

[51] Int. Cl.³ .............................................. B01D 46/00
[52] U.S. Cl. ........................................ 55/196; 55/355; 55/466; 55/DIG. 17
[58] Field of Search .......... 55/196, 355, 466, DIG. 17

[56] References Cited

U.S. PATENT DOCUMENTS

| | | | |
|---|---|---|---|
| 1,580,380 | 4/1926 | MacDonald | 55/DIG. 17 |
| 1,828,626 | 10/1931 | Swendeman | 55/187 X |
| 2,508,015 | 5/1950 | Dexter | 210/436 X |
| 2,760,596 | 8/1956 | Kellie | 55/169 X |
| 2,822,887 | 2/1958 | Engman | 55/DIG. 17 |
| 2,997,131 | 8/1961 | Fisher | 55/466 |
| 3,200,569 | 8/1965 | Wheeler | 55/208 |
| 3,507,098 | 4/1970 | Veres et al. | 55/219 |
| 3,751,231 | 8/1973 | Niedzielski | 23/260 |
| 3,898,063 | 8/1975 | Gazan | 55/276 |
| 3,920,425 | 11/1975 | Grantham | 55/227 |
| 4,116,650 | 9/1978 | Lane | 55/DIG. 17 |

Primary Examiner—John Adee
Attorney, Agent, or Firm—Lawrence P. Kessler

[57] ABSTRACT

An evaporator which removes liquid from a pneumatic line filter and holds the liquid for evaporation. The evaporator includes a wick of absorbent, porous material, such as felt comprised of blended substantially equal portions of wool and rayon. The wick is connected to the housing of a pneumatic line filter which removes and accumulates liquid entrapped in the flow in the pneumatic line. The housing includes a passage for the accumulated liquid so that the liquid drains into the wick where it is absorbed and held for evaporation to the atmosphere.

5 Claims, 4 Drawing Figures

EVAPORATOR

BACKGROUND OF THE INVENTION

This invention relates generally to pneumatic line filters, and more particularly to an evaporator for removing and evaporating liquid from a pneumatic line filter.

It is common practice in a wide variety of industrial applications to use pneumatic fluids as a source of motive power. The pneumatic fluid may be compressed air, for example, used for aspirators or driving fluid motors. In such applications, it is desirable to filter the pneumatic fluid to remove entrained foreign substances such as liquid (e.g. water vapor) or dust particles. Pneumatic line filters generally include a bowl-like housing, in which the liquid is collected and a filter for trapping the dust. In the past, when the housing was filled to capacity with liquid, the flow in the pneumatic line had to be interrupted and the housing emptied; however, this results in a shut down of the driven apparatus. To eliminate the necessity of apparatus shut-down, it was found that the housing could be provided with a drain for conducting the liquid away from the housing (see, for example, U.S. Pat. Nos. 1,828,626 issued Oct. 20 1931 in the name of Swendeman, or 3,507,098 issued Apr. 21, 1970 in the name of Veres et al). However, such drains undesirably jettison the collected liquid directly to the atmosphere. Therefore, some kind of catch basin or additional ducting is required to handle the jettisoned liquid. As is apparent, such structure increases the overall space requirements of the filter and introduces complications in its construction.

SUMMARY OF THE INVENTION

This invention is directed to an evaporator which removes liquid accumulated in a filter in a pneumatic line and holds the liquid for evaporation so as to eliminate the need for interrupting flow in the pneumatic line or for providing additional structure to carry away the accumulated liquid. The evaporator includes a wick of absorbent, porous material, such as felt comprised of blended substantially equal portions of wool and rayon. The wick is connected to the housing of the pneumatic line filter which removes and accumulates liquid entrapped in the flow in the pneumatic line. The housing includes a passage for the accumulated liquid so that the liquid drains into the wick where it is absorbed and held for evaporation to the atmosphere.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Figure 1:
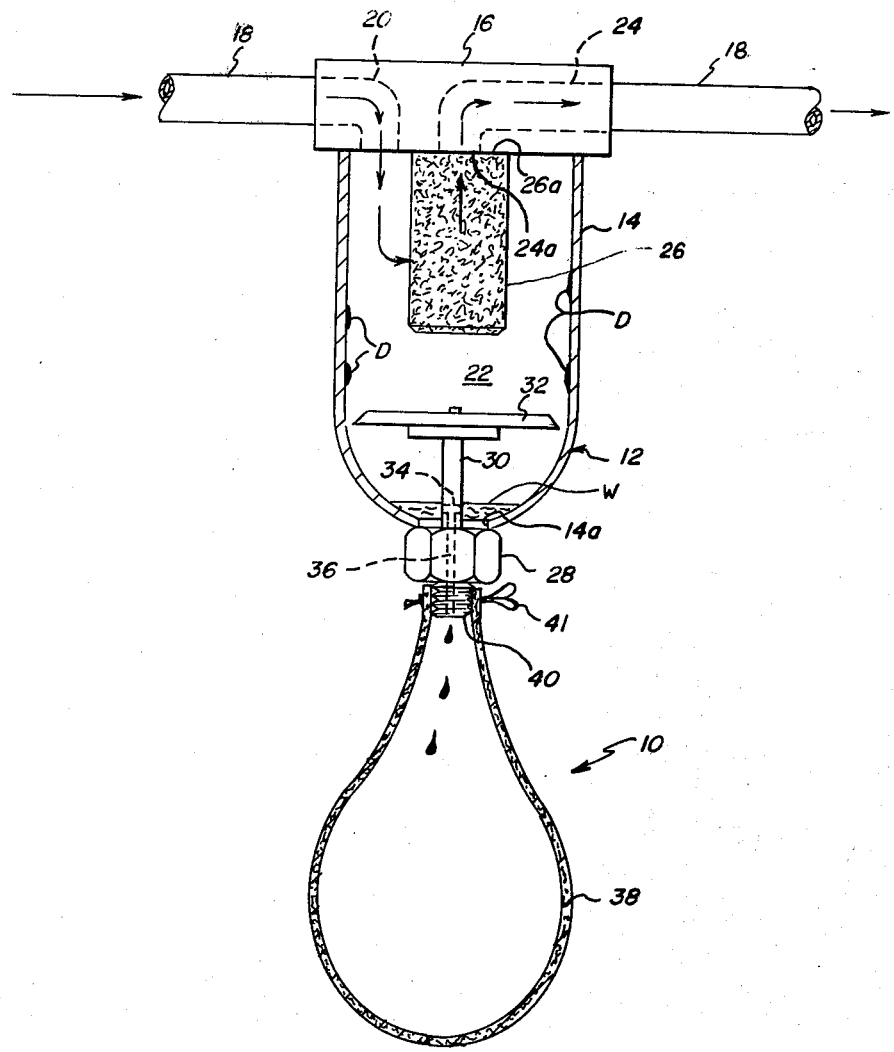
FIG. 1 is a side elevational view, partly in cross-section of a pneumatic line filter including an evaporator according to this invention.

Referring now to the drawings, FIG. 1 shows an evaporator 10 for a pneumatic line filter 12. The filter 12, as an illustrative example, includes a bowl-like housing 14 connected to a fitting 16 in the pneumatic line 18. The fitting has an inlet passage 20, providing flow communication between the line 18 and the interior cavity 22 of the housing 14, and an outlet passage 24, providing flow communication between the cavity 22 and the line 18. A substantially cylindrical filter element 26, such as a sintered bronze or fine plastic screen for example, is connected to the fitting 16 at one end 26a and extends into the cavity 22. The end 26a surrounds the opening 24a of the outlet passage 24.

Accordingly, the fluid (typically compressed air) flowing in the pneumatic line 18 is diverted from the line by the inlet passage 20 of fitting 16 into the interior cavity 22 of housing 14 with a concomitant drop in pressure. It then passes through the filter element 26 before returning through the outlet passage 24 to the pneumatic line. As the fluid moves through the cavity 22, any liquid, such as water vapor or oil droplets, trapped in the fluid is condensed, due to the pressure drop, as droplets D and deposited on the interior wall of the housing 14. Further, any dust particles suspended in the fluid are trapped in the filter element 26 so that fluid returning to the line 18 through passage 24 is substantially free of both moisture and dust.

The droplets D fall by gravitational force to the bottom of the housing 14 where they are collected and accumulate as a pool of liquid W. The bottom of the housing 14 has an opening 14a sealed by a boss 28. A substantially vertical stem 30 is connected to the boss 28 and extends upwardly into the cavity 22. A baffle 32, mounted on the stem 30, prevents fluid flow in the interior cavity 22 from disturbing the accumulated pool of liquid in the bottom of the housing 14. The stem 30 has an internal passage 34 in fluid communication with the interior cavity 22 and a passage 36 through the boss 28. Thus, when the liquid accumulated at the bottom of the housing 14 covers the passage 34, the liquid enters the passage 34 and flows through the passage 36 in the boss.

A bulbous evaporator 38 is connected by a clamp 41 to a threaded extension 40 of the boss 28. The evaporator 38 is made of a highly absorbent, porous wick material such as felt comprised of blended substantially equal portions of wool and rayon for example. The liquid from the pool in the housing 14 flowing through the passage 36 exits from the passage and is absorbed by the wick and held there for evaporation to the atmosphere. The thickness and surface area of the wick is selected to be sufficient to absorb and hold substantially all liquid for evaporation over typically encountered varying relative humidity conditions. Thus, the need for additional structure to carry away the liquid is eliminated. Further, the wick substantially muffles any acoustical noise caused by any fluid flow emitted from the filter through the passage 36.

Figure 2:
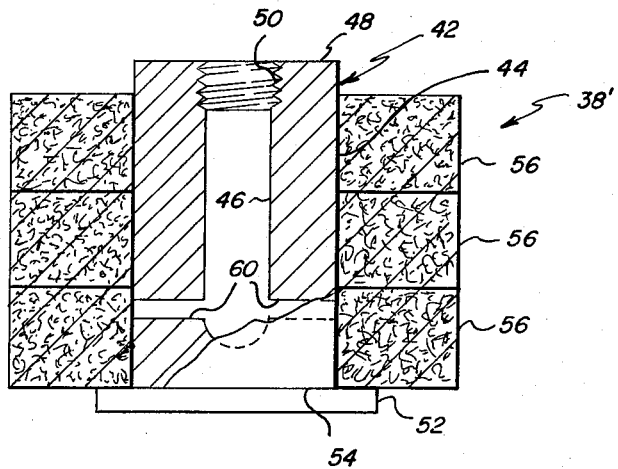
FIG. 2 is a side elevational view, in cross-section, of an alternate embodiment of the evaporator of FIG. 1.
Figure 3:
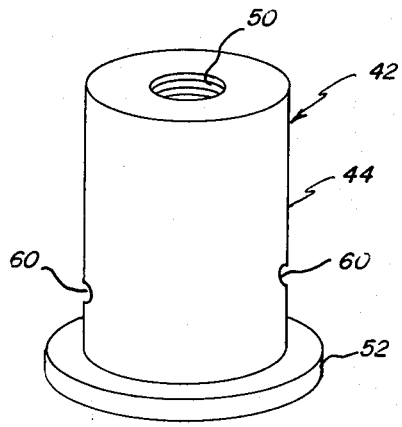
FIG. 3 is a view, in perspective, of the wick support of the evaporator of FIG. 2.
Figure 4:
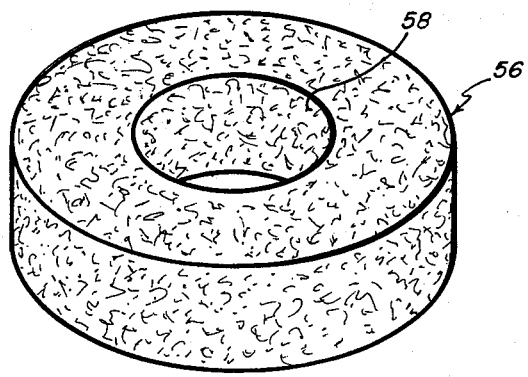
FIG. 4 is an enlarged view, in perspective, of the wick of FIG. 2.

An alternate embodiment of the evaporator, designated generally 38', is shown in FIGS. 2–4. The evaporator 38' includes a support 42 and a plurality of annular wicks 56 held on the support. The support 42 has a substantially cylindrical body 44 with a concentric bore 46 along the longitudinal axis of the body. The bore 46 extends from one end 48 of the body for less than the full height of the body. A portion 50 of the bore 46 adjacent to the end 48 has threads complimentary to the threaded extension 40 of the boss 28 so that the support 42 can be readily attached to the extension. A flange 52 is attached to the body 44 at the end 54 to retain the plurality of annular wicks 56 on the body. The wicks 56 respectively have a central bore 58 (FIG. 4), the diameter of which is substantially equal to the diameter of the body 44. Accordingly, upon assembly the wicks are slipfitted over the body 44 to rest on the flange 52 and the support 42 is then threaded on the extension 40.

The body 44 has transverse bore 60 establishing flow communication between the bore 46 and the exterior of the body. Thus, liquid from the pool in the housing 14 of the filter travels through the passage 36 into the bore 46 and is delivered via bores 60 to the wicks 56 surrounding the body 44. The wicks, which are made of a similar material to the wick material mentioned above, absorb the liquid and hold it for evaporation to the atmosphere while providing acoustical noise muffling as described relative to the previous embodiment.

The invention has been described in detail with particular reference to preferred embodiments thereof, but it will be understood that variations and modifications can be effected within the spirit and scope of the invention.

We claim:

1. In a filter adapted to be coupled to a pneumatic line for removing liquid from flow in such line, said filter including a liquid accumulating housing, and means for removing liquid from the flow and accumulating such liquid in the interior of said housing, the improvement comprising means for evaporating such accumulated liquid, said evaporating means including:
   a wick of liquid absorbent, porous material located solely exteriorly of said housing and removably connected to the exterior of said housing for absorbing liquid and holding such liquid for evaporation to the atmosphere; and
   means for defining a passage for such liquid between the interior of said housing and said external wick so that accumulated liquid drains from said housing into said wick.

2. The invention of claim 1 wherein said wick comprises felt blended of substantially equal portions of wool and rayon.

3. In a pneumatic line filter adapted to be coupled to a pneumatic line, said filter including a liquid accumulating housing, and means for directing flow from said pneumatic line through said housing to remove liquid from the flow and accumulate such liquid in said housing, the improvement comprising means for evaporating such accumulated liquid, said evaporating means including:
   means in said housing for defining a passage for accumulated liquid so that such liquid drains from said housing;
   a support connected to the exterior of said housing adjacent to said passage means, said support having an external peripheral surface and defining an internal passage for providing liquid flow communication between said passage means and said external peripheral surface; and
   a wick of liquid absorbent, porous material, said wick being mounted on said external peripheral surface of said support and in communication with said internal passage for receiving liquid from said internal passage, absorbing such liquid and holding such liquid for evaporation to the atmosphere.

4. The invention of claim 3 wherein said support comprises a substantially cylindrical post, and said wick includes at least one annular member carried by and surrounding said post.

5. The invention of claim 4 wherein said wick comprises felt blended of substantially equal portions of wool and rayon.

* * * * *